United States Patent [19]

O'Connor

[11] Patent Number: 5,250,136
[45] Date of Patent: Oct. 5, 1993

[54] METHOD OF MAKING A CORE/PATTERN COMBINATION FOR PRODUCING A GAS-TURBINE BLADE OR COMPONENT

[75] Inventor: Kurt F. O'Connor, Carmel, Ind.

[73] Assignee: General Motors Corporation, Detroit, Mich.

[21] Appl. No.: 834,673

[22] Filed: Feb. 12, 1992

[51] Int. Cl.$^5$ ............................................. B32B 31/00
[52] U.S. Cl. ................................ 156/272.2; 156/272.8; 156/62.2; 156/242; 264/56; 264/25; 29/527.6
[58] Field of Search ............... 156/272.8, 272.2, 273.3, 156/273.5, 62.2, 155, 242, 245; 29/527.6; 264/56, 25

[56] References Cited

U.S. PATENT DOCUMENTS

| | | | |
|---|---|---|---|
| 3,672,787 | 6/1972 | Thorstenson | 416/97 |
| 4,283,835 | 8/1981 | Obrochta et al. | 29/527.6 |
| 4,314,007 | 2/1982 | Gessinger | 428/614 |
| 4,358,882 | 11/1982 | Wilkinson | 29/156.8 H |
| 4,375,233 | 3/1983 | Rossmann et al. | 164/9 |
| 4,422,229 | 12/1983 | Sadler | 29/527.6 |
| 4,531,981 | 7/1985 | Singer | 148/11.5 N |
| 4,561,491 | 12/1985 | Slack | 164/516 |
| 4,605,057 | 8/1986 | Sakai et al. | 164/519 |
| 4,863,538 | 9/1989 | Deckard | 156/62.2 |
| 4,938,816 | 7/1990 | Beaman | 156/62.2 |
| 4,944,817 | 7/1990 | Bourell | 156/62.2 |
| 4,989,664 | 2/1991 | Roth | 164/361 |
| 5,038,014 | 8/1991 | Pratt | 264/25 |
| 5,053,090 | 10/1991 | Beaman | 156/272.8 |
| 5,147,587 | 9/1992 | Marcus | 156/89 |
| 5,156,697 | 10/1992 | Bourell | 156/62.2 |
| 5,182,170 | 1/1993 | Marcus | 156/62.2 |

FOREIGN PATENT DOCUMENTS

| | | |
|---|---|---|
| 0115092 | 2/1983 | European Pat. Off. . |
| 0089155 | 3/1983 | European Pat. Off. . |
| 0166940 | 5/1985 | European Pat. Off. . |
| WO90/03893 | 4/1990 | PCT Int'l Appl. . |

OTHER PUBLICATIONS

Stuart Uram, Certech Incorporated, "Assembly of Ceramic Cores to Form Complex Passageways", 29th Annual Meeting of the Investment Casting Institute, pp. 4a:01–4a:10.

Stuart Uram, Certech Incorporated, "Commercial Application of Ceramic Cores", 26th Annual Meeting of the Investment Casting Institute 1978, pp. 10:1–10:12.

Description of Refractories Commonly Used in Investment Casting, submitted by Kurt O'Connor, Allison Gas Turbine, pp. 100-79-105-79; 106-82 (five pages); 120-79; 130-79.

Robert A. Horton, PCC Airfoils Inc., "Investment Casting", pp. 253-269.

Sharon Machlis, Associate Editor, "How to Bring CAD to Life", Design News Technology Focus, Mar. 26, 1990, pp. 54-66.

Primary Examiner—David A. Simmons
Assistant Examiner—Mark DeSimone
Attorney, Agent, or Firm—Cary W. Brooks

[57] ABSTRACT

Disclosed is a method of making a fused pattern/core combination for a gas-turbine blade or component. A plurality of powder layers are fused together by a laser beam in a layer-by-layer fashion to produce the pattern/core combination. The core may have thin sections having a thickness of about 0.06 of an inch.

7 Claims, No Drawings

METHOD OF MAKING A CORE/PATTERN COMBINATION FOR PRODUCING A GAS-TURBINE BLADE OR COMPONENT

FIELD OF THE INVENTION

This invention relates to a method of making a fused core/pattern combination for a cast gas-turbine blade or component. In particular, the invention relates to a method of making a core/pattern combination for a cast gas-turbine blade or components by sequentially fusing regions of ceramic powder to form a layer of the core and adjacent thereto depositing wax or plastic to form a region of the pattern in a layer-by-layer fashion to make a core/pattern combination.

BACKGROUND OF THE INVENTION

A variety of methods are known for making ceramic cores suitable for use in producing cast gas-turbine blades. These prior art methods include the step of covering the ceramic core with a protective coating such as an epoxy or phenolic resin to prevent the very fragile core from breaking during handling. However, the protective coating is undesirable in that it prevents subsequent mechanical work from being performed on the core, such as providing further detail or drilling holes in the core. Thereafter, the core is covered by a wax or plastic by injection molding to form a pattern of the blade or component to be cast. These steps are expensive and time consuming.

Thus, it would be desirable to provide a method of making a gas-turbine blade or component by a simple method which avoids the need to build ceramic core dies or wax pattern dies, and eliminates the need for handling the core in a fragile state and eliminates the injection molding step to produce a pattern around the core.

SUMMARY OF THE INVENTION

The present invention includes a method of making a core/pattern combination wherein the core has a configuration corresponding to the hollow portion of a gas-turbine blade or component and the pattern has a configuration corresponding to the blade or component. The inventive steps include sequentially fusing together a plurality of ceramic powder regions to form a portion of the core, and adjacent thereto fusing wax or plastic powder in regions to form a portion of the pattern, in a layer-by-layer fashion to produce a core/pattern combination. The present invention also includes a method of producing a fused core or pattern including sections having a thickness less than 0.02 inches. The invention also includes a method of making a hollow gas-turbine blade using molten alloy at temperatures ranging from about 1200° F. to about 3300° F.

DETAILED DESCRIPTION OF THE INVENTION

As stated above, the invention includes a method of making a core/pattern combination by sequentially fusing together regions of ceramic material (or powder) and regions of wax or plastic powder in a layer-by-layer fashion to produce the core/pattern combination. Preferably, the layers of powder are fused together by directing a laser beam onto successive layers of powder including quartz. A suitable apparatus and method of operation for accomplishing the laser fusion of powdered material is described in U.S. Pat. No. 4,863,538, the disclosure of which is hereby incorporated by reference. The fusing together of the powder layers may be accomplished by directing wave energy onto predetermined patterns of the powder. Such wave energy may include an electron beam.

As described in U.S. Pat. No. 4,863,538, an apparatus useful in connection with the present invention includes a laser or other directed energy source which is selectable for emitting a beam on a target area where a part is to be produced. A powdered dispensing system deposits powder onto the target area. A control mechanism operates to selectively fuse or sinter only the powder disposed within the fine boundaries to produce the desired layer of the part. The control mechanism operates the laser to selectively sinter or fuse sequential layers of the powder, producing a completed part comprising a plurality of layers sintered or fused together. The defined boundaries of each layer correspond to respective cross-section regions of the part. The control mechanism may include a computer such as a CAD/CAM system to determine the defined boundaries of each layer. Given the overall dimensions and configuration of the part to be produced, the computer determines the defined boundaries for each layer and operates a laser control mechanism in accordance with the defined boundaries.

The laser control mechanism may include a means for directing the laser beam on the target area and a means for modulating the laser beam between on and off positions or a shuttering means to selectively sinter or fuse the powder in the target area to produce varying configurations as desired. The directing mechanism may operate to move the aim of the laser beam in a continuous raster scan of the target area. A modulating mechanism turns the laser beam on and off so that the powder is sintered or fused only when the aim of the laser beam is within the defined boundaries for the particular layer. The directing mechanism may aim the laser beam only within defined boundaries for the particular layer so that the laser beam can be left on continuously to sinter the powder within the defined boundaries of the particular layer.

The directing mechanism may move the laser beam in a respective raster scan of the target area using mirrors driven by galvanometers. A first mirror may reflect the laser beam to a second mirror which may reflect the beam onto the target. Movement of the first mirror by its galvanometer shifts the laser beam generally in one direction in the target area. Movement of the second mirror by its galvanometer shifts the laser beam in the target area in a second direction. The mirrors may be oriented relative to each other so that the first and second directions are generally perpendicular to each other. This arrangements allows for many different types scanning patterns of the laser beam in the target area, including a raster scan pattern.

The dispensing of the powder may be assisted by using a confinement structure which defines the outer perimeter of each layer. Each layer may be defined by a separate confinement structure or the entire part may be defined by a single confinement structure. When passages or voids in a particular layer are desirable, such may be obtained by simply not sintering or fusing the powder in the area for the void or passage. After the selective portions of the layer have been fused, the loose powder may be brushed away or blown off to define the void or passage. Alternatively, a passage or void may be defined by placing a different type of material on top of the previous fused layer at the location of the void or passage and depositing the next loose powder layer around the insert and thereafter fusing the powder. Preferably, the insert would be constructed of material and positioned such that it may be dissolved or otherwise removed after the powder is fused together to form the void or passage.

The steps of the method of the present invention include the following. First, a three-dimensional configuration of the hollow portion of a gas-turbine blade or component must be determined. Second, a three-dimensional configuration of the blade or component must be determined. The core may be produced by fusing together layers of ceramic powder, preferably quartz, in a layer-by-layer fashion corresponding to discrete cross-sectional regions of the hollow portion of the gas-turbine blade. A first layer of powder comprising ceramic material is deposited on a substrate in a predetermined pattern corresponding to a first cross-sectional region of the hollow portion of the gas-turbine blade. The first layer of powder is fused together by directing a laser beam over the predetermined pattern of the first layer of ceramic powder to form a first fused layer of ceramic having the shape of the first cross-sectional region of the hollow portion. Likewise, the pattern may be produced by fusing together regions of wax or plastic, which may be deposited adjacent the ceramic powder or fused ceramic, and in a manner consistent with forming each layer of the core. A second layer of ceramic powder is deposited on the first layer of fused ceramic or fused wax or plastic in a second predetermined pattern corresponding to a second cross-sectional region of the hollow portion which is immediately adjacent to the first cross-sectional region. The second layer of powder is fused together by directing a laser beam over the second predetermined pattern to form a second fused layer of ceramic having the shape of the second cross-sectional region of the hollow portion, and so that the second fused layer is fused to the first fused layer. The second layer of the pattern is formed in a similar fashion as described above. Successive layers of powder are deposited onto previous fused layers in predetermined patterns corresponding to respective cross-sectional regions of the hollow portion of the core and of the pattern. Each of the successive layers of powder is fused together to form successive fused layers, wherein each of the successive fused layers are fused to a previously fused layer to form the core having a configuration corresponding to the hollow portion of the gas-turbine blade or component, and a pattern having a configuration corresponding to the blade or component.

The core/pattern combination may be used to make a gas-turbine blade. A readily removable casting mold is placed around the pattern and the core so that it conforms to the outer surface of the pattern. The wax or plastic pattern may be removed in a manner known in the art, such as preheating the wax pattern or dissolving the plastic pattern. Molten alloy is poured into the casting mold so that the molten alloy and the molten alloy is thereafter solidified. The cast molding may be broken away and the core removed with molten caustic.

Preferably, the ceramic powder comprises quartz. The quartz may comprise alpha or beta quartz. All powders will have an average particle size under 100 micron. When the quartz powder is alpha/beta quartz, a core made from the same can withstand the casting of a molten alloy having a temperature ranging from about 1200° F. to about 3300° F.

The wax or plastic powder used to produce the pattern may have a similar size and configuration. Each layer of fused pattern may have a thickness of about 0.010 to 0.06 inches.

The embodiments of the invention in which an exclusive property or privilege is claimed are defined as follows:

1. A method of making a core/pattern combination comprising the steps of:

depositing a first layer of powder comprising a ceramic onto a substrate in a predetermined pattern corresponding to a first cross-sectional region of a hollow portion of a gas-turbine blade or component;

fusing together said first layer of ceramic powder by directing a laser beam over the predetermined pattern of said first layer of powder to form said fused layer of ceramic having a shape of said first cross-sectional region of said hollow portion;

depositing a first layer of powder comprising at least one selected from the group consisting of wax and plastic on said substrate in a predetermined pattern corresponding to a first cross-sectional region of said blade or component;

fusing together said first layer of wax or plastic powder by directing a laser beam over the predetermined pattern corresponding to said first cross-section of blade or component to form a fused layer of wax or plastic having a shape corresponding to said first cross-sectional region of said blade or component;

the fused regions of ceramic and the fused regions of wax or plastic of the first layer forming a first fused layer;

depositing a second layer of ceramic powder onto said first fused layer in a second predetermined pattern corresponding to a second cross-sectional region of said hollow portion which is immediately adjacent said first cross-sectional region for the same;

fusing said second layer of ceramic powder by directing a laser beam over said second predetermined pattern of said hollow portion to form a second fused layer of ceramic having the shape of said second cross-sectional region of said hollow portion, and so that said second fused layer of ceramic is fused to said first fused layer;

depositing a second layer of wax or plastic powder onto said first fused layer in a second predetermined pattern corresponding to a second cross-sectional region of said blade or component which is immediately adjacent to the first cross-sectional region for the same;

fusing said second layer of wax or plastic by directing a laser beam over said second predetermined pattern of said blade or component to form a second fused layer of wax or plastic having the shape of said second cross-sectional region of said blade or component, and so that said fused layer of wax or ceramic is fused to said first fused layer; and depositing successive layers of powder onto previous fused layers of ceramic or fused layers of wax or plastic in predetermined patterns corresponding to a respective cross-sectional regions of said hollow portion and said blade or component, and fusing each of said successive layers of powder to form successive fused layers, wherein each of said successive fused layers are fused to a previous fused layer to form said core having a configuration corresponding to said hollow portion of said gas-turbine blade and a pattern having a configuration corresponding to said blade or component.

2. A method as set forth in claim 1 wherein said ceramic powder comprises quartz.

3. A method as set forth in claim 1 wherein said core has sections having a thickness less than 0.06 of an inch.

4. A method of making a gas-turbine blade or component comprising the steps of:

depositing a first layer of powder comprising a ceramic onto a substrate in a predetermined pattern corresponding to a first cross-sectional region of a hollow portion of a gas-turbine blade or component;

fusing together said first layer of ceramic powder by directing a laser beam over the predetermined pattern of said first layer of powder to form said fused layer of ceramic having a shape of said first cross-sectional region of said hollow portion;

depositing a first layer of powder comprising at least one selected from the group consisting of wax and plastic on said substrate in a predetermined pattern corresponding to a first cross-sectional region of said blade or component;

fusing together said first layer of wax or plastic powder by directing a laser beam over the predetermined pattern corresponding to said first cross-section of blade or component to form a fused layer of wax or plastic having a shape corresponding to said first cross-sectional region of said blade or component;

the fused regions of ceramic and the fused regions of wax or plastic of the first layer forming a first fused layer;

depositing a second layer of ceramic powder onto said first fused layer in a second predetermined pattern corresponding to a second cross-sectional region of said hollow portion which is immediately adjacent said first cross-sectional region for the same;

fusing said second layer of ceramic powder by directing a laser beam over said second predetermined pattern of said hollow portion to form a second fused layer of ceramic having the shape of said second cross-sectional region of said hollow portion, and so that said second fused layer of ceramic is fused to said first fused layer;

depositing a second layer of wax or plastic powder onto said first fused layer in a second predetermined pattern corresponding to a second cross-sectional region of said blade or component which is immediately adjacent to the first cross-sectional region for the same;

fusing said second layer of wax or plastic by directing a laser beam over said second predetermined pattern of said blade or component to form a second fused layer of wax or plastic having the shape of said second cross-sectional region of said blade or component, and so that said fused layer of wax or ceramic is fused to said first fused layer;

depositing successive layers of powder onto previous fused layers of ceramic or fused layers of wax or plastic in predetermined patterns corresponding to a respective cross-sectional regions of said hollow portion and said blade or component, and fusing each of said successive layers of powder to form successive fused layers, wherein each of said successive fused layers are fused to a previous fused layer to form said core having a configuration corresponding to said hollow portion of said gas-turbine blade and a pattern having a configuration corresponding to said blade or component;

placing a readily removeable casting mold around said pattern and core and conforming to said pattern;

removing said pattern to leave a void;

pouring a molten alloy into said casting mold to fill said void;

solidifying said alloy;

removing said casting mold; and removing said core with liquid caustic.

5. A method as set forth in claim 4 wherein said ceramic powder comprises quartz.

6. A method as set forth in claim 4 wherein said core has sections having a thickness less than about 0.06 of an inch.

7. A method as set forth in claim 4 wherein said molten alloy has a temperature ranging from about 1200° F. to about 3300° F.

* * * * *